(No Model.) 2 Sheets—Sheet 1.

F. C. AMSBARY.
STOP AND WASTE VALVE.

No. 536,119. Patented Mar. 19, 1895.

WITNESSES
Franck L. Ourand.
M. C. Stevens

INVENTOR
Frank C. Amsbary.
by J. Fred. Keily,
his Attorney

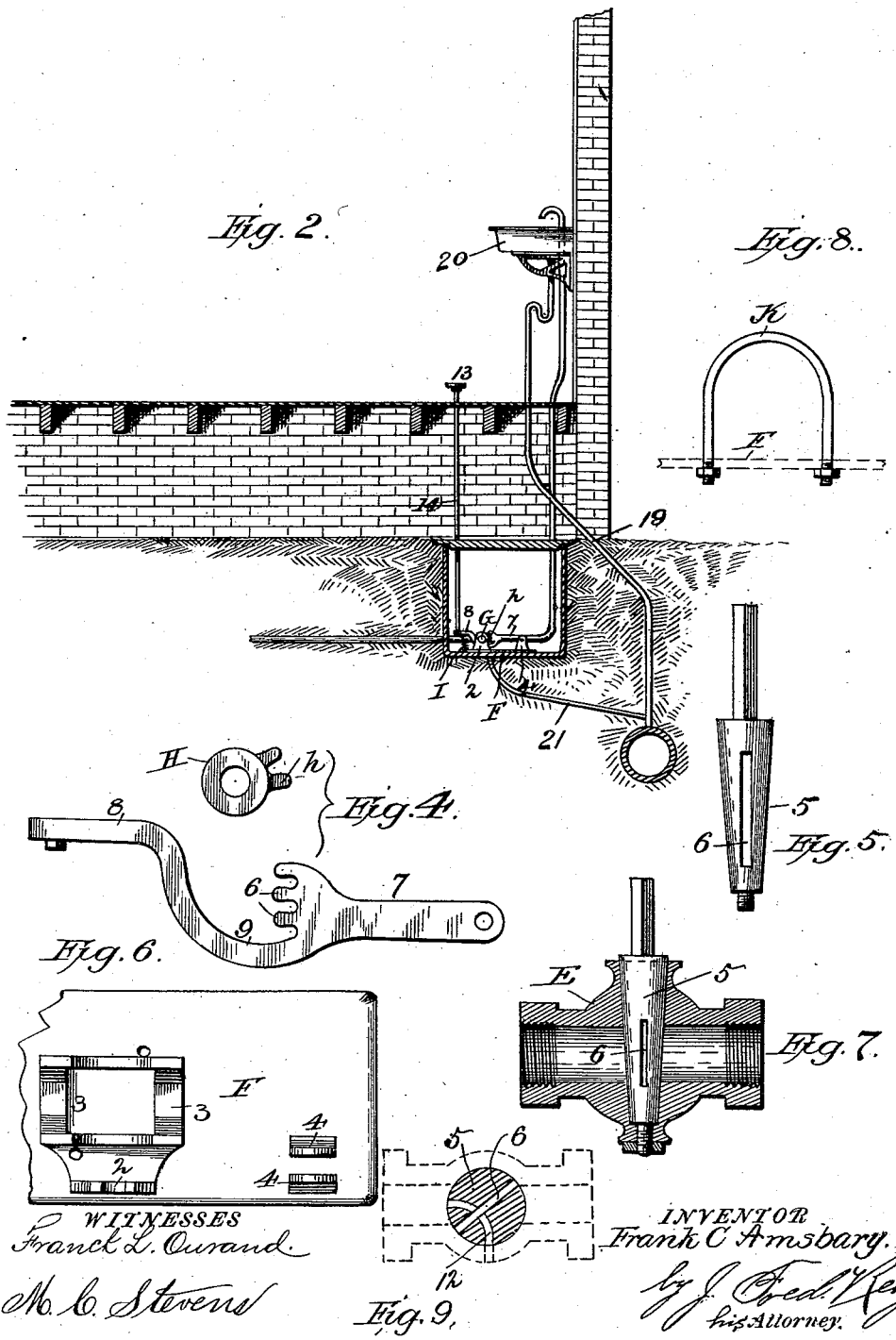

UNITED STATES PATENT OFFICE.

FRANK C. AMSBARY, OF LITTLE ROCK, ARKANSAS.

STOP AND WASTE VALVE.

SPECIFICATION forming part of Letters Patent No. 536,119, dated March 19, 1895.

Application filed October 31, 1894. Serial No. 527,511. (No model.)

*To all whom it may concern:*

Be it known that I, FRANK C. AMSBARY, a citizen of the United States, residing at Little Rock, in the county of Pulaski and State of Arkansas, have invented certain new and useful Improvements in Stop and Waste Valves; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to valves for supplying flush water to closet bowls, urinals, sinks and other connections.

The object of the improvement is to secure a minimum amount of movement of the valve stem in the turning off and on of the water supply to the fixture; also providing means whereby the valve may be located a proper distance from the surface to obviate freezing and at the same time be susceptible of easy manipulation when it is required to obtain a supply of water.

The improvement will be more fully set forth and claimed hereinafter and illustrated in the accompanying drawings, in which—

Figure 1:
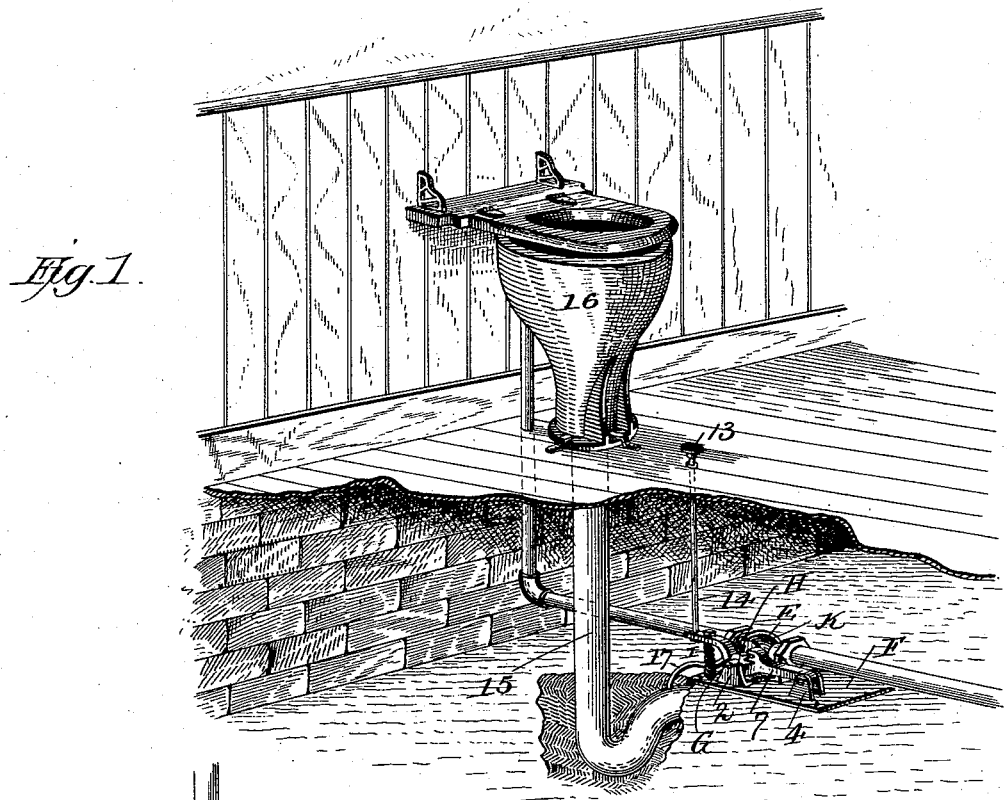
Figure 3:
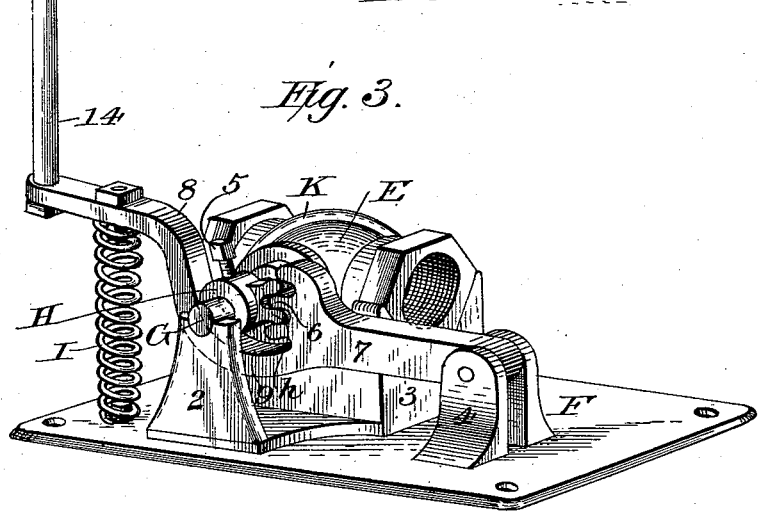

Figure 1 is a view showing the application of the invention to a water closet. Fig. 2 is a view showing the invention applied to a kitchen sink. Fig. 3 is a view of the valve on a larger scale. Fig. 4 is a detail view of the operating lever and the toothed collar attached to the valve stem. Fig. 5 is a detail view of the valve plug. Fig. 6 is a detail view of the base plate to which the operating parts are attached. Fig. 7 is a vertical section of the valve casing. Fig. 8 is a detail view of the clip for securing the valve casing upon the base plate. Fig. 9 is a cross section of the plug showing its relative position to the valve casing, the latter being shown in dotted lines, when draining the pipe.

The base plate F is provided with lugs 2, 3 and 4. The valve casing or body E is of usual construction and has its plug 5 provided with a narrow port 6 through which the water passes to the fixture. This port 6 is long and narrow and registers with corresponding ports in the valve casing in the well known manner. By this construction of port a slight movement of the plug is only necessary to open and close the valve. The port is about one sixteenth of an inch wide. Hence a movement of the plug through a small radius will open the valve to its fullest extent or close it as required. The casing rests upon the lug 3 which is notched in its upper surface to receive it and is held in place by a wire clip K passing over the casing and having its ends threaded and extended through openings in the base plate F. The projecting ends of the clip will be supplied with nuts by means of which the clip is tightened upon the casing to hold it firmly in place.

The collar H mounted upon the plug stem G, has a series of teeth *h* which are engaged by corresponding teeth 6 on an arm 7 of the operating lever 8 fulcrumed at one end to the lugs 4. This collar is held on the stem G by a binding screw 5 or other suitable fastening. The lug 2 is depressed in its top end to receive and form a bearing for the outer end of the plug stem and support it against the stress exerted thereon by operating the lever 8.

The lever 8 has the horizontal arm 7 about midway of its ends and a downward curve 9 in front of the arm 7 to admit of the free workings of the toothed portion of the collar H. From the point 9 the lever curves upward and outward as shown. A spring I is interposed between the outer end of the lever and the base plate and serves to hold the lever in a normal position. This spring is fitted at its ends to projections on, respectively, the lever and the plate. The parts are disposed with reference to having the valve opened by a downward movement of the free end of the lever 8.

The part 9 of the lever 8, which extends under the valve stem G, operates as a stop to regulate the movement of the valve; its lower side coming in contact with the base-plate on the downward movement and its upper side contacting with the under side of the valve stem on the upward movement causing the valve water way port and the waste way port to be brought into exactly the right positions by stopping the revolution of the valve at the proper points, thus insuring perfect operation.

In practice the valve is designed to be placed below the freezing line and is provided with the usual waste 12 which is suitably connected with a convenient portion of the waste pipe. A foot plate 13 is connected by a rod 14 with the free end of the lever 8 so that when pressure is brought to bear upon the said plate 13 the valve will be opened to flush the closet or supply water to the sink or basin. When the pressure is removed the spring I will regain itself and close the valve automatically.

In Fig. 1 the waste is shown connected by a small pipe 17 with the soil or sewer pipe 15 leading from the closet 16. In Fig. 2 the waste is shown attached by small pipe 21 to the waste pipe 19 leading from the sink 20. On pressing upon the plate 13 with the foot a supply of water is had to the required fixture in the usual manner, and when the pressure is removed the supply of water is shut off and the waste is opened and the water in the pipe running from the valve to the fixture is drained off and freezing thereby obviated in winter time.

Having thus described my invention, what I claim as new, and desire to secure by Letters Patent, is—

1. The combination with a plate having a bearing lug, and a valve held upon the plate and having its stem obtaining a bearing in the said lug, of a toothed collar applied to the valve stem, a lever having a toothed portion to mesh with the said toothed collar, and having a portion extending between the plate and the valve stem to engage with each and limit its movements, and a spring for normally closing the valve by direct action on the said lever, substantially as specified.

2. In combination a plate having a bearing lug, a valve held upon the plate with its stem seated in the said bearing lug, a toothed collar held upon the valve stem, and a lever pivoted to the plate and having a toothed extension to mesh with the toothed collar, and having a portion to operate in the space between the valve stem and the said plate, substantially as described for the purpose specified.

3. In combination, a plate having lugs 2, 3, and 4, a valve held by clip to the lug 3 and having its plug stem obtaining a bearing upon the lug 2, a toothed collar mounted upon the plug stem, a lever pivoted to the lug 4 and having a toothed extension between its ends to co-operate with the toothed collar, and having its outer portion curved downwardly, upwardly, and outwardly, and a spring interposed between the lever and the plate, substantially as described for the purpose specified.

In testimony whereof I affix my signature in presence of two witnesses.

FRANK C. AMSBARY.

Witnesses:
WM. I. AINSWORTH,
R. D. MORRIS.